Dec. 26, 1939.　　　O. P. BIGELOW　　　2,184,920
OPHTHALMIC CHART
Filed Sept. 2, 1937
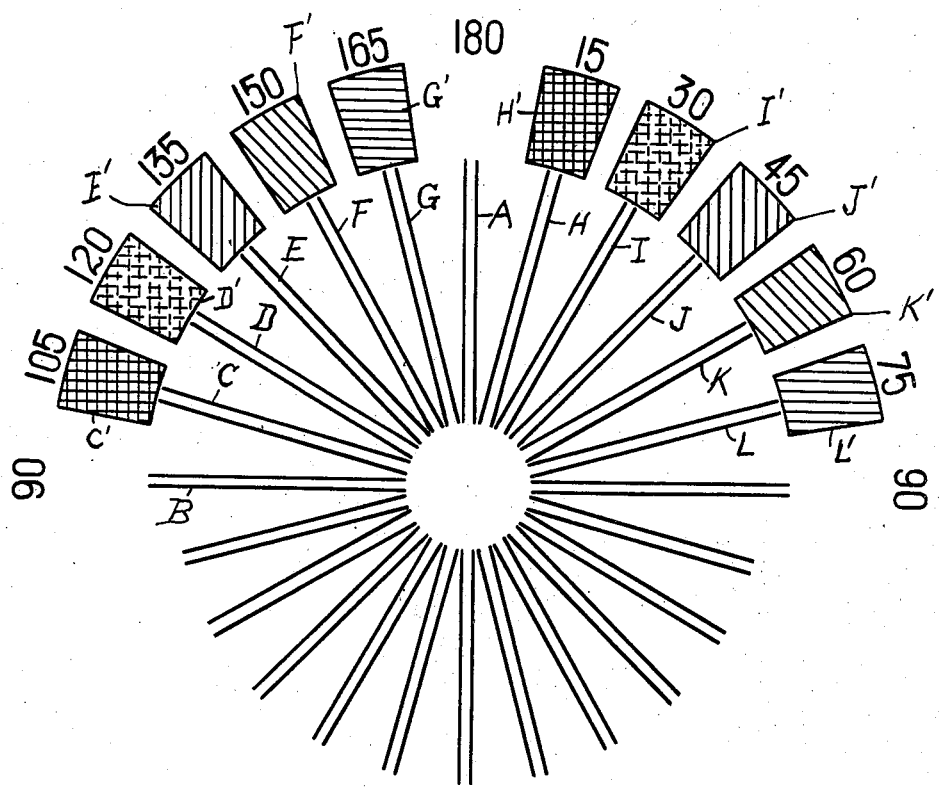
Oliver P. Bigelow　INVENTOR.
BY
W. G. Burns ATTORNEY.

Patented Dec. 26, 1939

2,184,920

UNITED STATES PATENT OFFICE 2,184,920

OPHTHALMIC CHART

Oliver P. Bigelow, Roanoke, Ind.

Application September 2, 1937, Serial No. 162,175

2 Claims. (Cl. 88—20)

This invention relates to improvements in ophthalmic charts for testing the vision of patients afflicted with astigmatism, to determine the axis of the cylindric lens required for correction.

An object of the invention is to enable the patient to more readily report to the examiner the particular meridian on the chart that appears clearest to his vision during the testing operation.

Another object of the invention is to provide a greater facility to the operator in testing the vision of astigmatic patients than that afforded by the ordinary clock dial chart in common use, the present chart being such as to enable the operator to determine with mathematical calculation the proper axis on which to place the lens cylinder in a trial frame such as are commonly used in fitting glasses to a patient.

Other objects and advantages of the invention will appear in the following description.

An illustrative embodiment of the invention is shown in the accompanying drawing which is a front face view of a chart displaying the features of the invention.

Essentially, there are displayed on the chart a series of test-elements, radially disposed about a common center, each test-element made up of a group of parallel lines, said parallel lines running in those various directions in the individual test-elements which mark the various meridians of a circle which are commonly employed in testing the eye for astigmatism, the meridian A being vertical and the meridian B being horizontal. The left-hand group of meridians C, D, E, F and G, and the right-hand group of meridians H, I, J, K and L are disposed between the vertical and horizontal meridians A and B respectively and constitute off-axis meridians.

Preferably, the meridians are of uniform length and spaced equally apart from each other, and adjacent the upper outer ends of the left and right-hand groups of off-axis meridians are disposed corresponding series of indicating areas C', D', E', F', G' and H', I', J', K' and L', the individual areas of each group being differently colored.

There are also displayed, adjacent the outer ends of each of the colored indicating areas, numerical indicia corresponding with the degrees of slant of the respective meridians from a definite point. For instance, the horizontal meridian is indicated by 90; the next succeeding left-hand off-axis meridian C is indicated by 105; the meridian D is indicated by 120; and the other off-axis meridians in the same group are indicated respectively by other numerals according to the degrees of inclination thereof. The colored areas adjacent the ends of the meridians H, I, J, K, and L likewise have associated therewith numerals indicating the degree of the slants of the corresponding meridians commencing from the vertical meridian A which is indicated above its top by 180.

In regard to the colored areas C', D', E', F' and G', displayed on the left side of the chart, and H', I', J', K' and L', displayed on the right side of the chart, the various patterns with which they are filled in represent various colors or shades. These areas may be considered to be colored, in this case, as follows: C' and H' are black; D' and I', yellow; E' and J', red; F' and K', green; and G' and L', blue. The colors are duplicated on the two sides of the chart because the distinctive colors available are so few.

In use, the chart is positioned a suitable distance in front of the patient within the range of his normal vision. Upon viewing the chart, with the use of one eye only at a time, the astigmatic patient announces which of the meridians appears to his vision most distinctly, naming the color of the indicating area at the end thereof, if any, and also stating whether the indicating color area selected lies in the left or right-hand group of the meridians. The operator, thus being informed, may readily ascertain by observing the corresponding numerical indicia, the proper position to adjust the lens cylinder in the trial frame (not shown) which is employed in connection with the use of the chart as in the usual practice.

By use of the radially disposed uniform meridians, augmented by the indicating colored areas and the numerical indicia, the astigmatic patient is materially aided in reporting the most clearly visible meridian on the chart, and the operator thereupon is more accurately informed of the ascertainments thus made by the patient.

The chart herein illustrated and described is exemplary and is susceptible to variations in the arrangement, number and shape of the test-elements marking the meridians, and in the shape and color of the indicating colored areas, and in their relative number and positions with respect to the test-elements and in the arrangement of the numerical indicia by which may be further facilitated examination of the patient, without departure from the spirit and scope of the invention.

If desired, indicating colored areas may be disposed at both ends of the off-axis meridians so that similar colors appear at the opposite ends of each meridian instead of one end only.

A feature characteristic of the invention, is the association on a chart of test-elements made up of groups of parallel lines marking the meridians, the indicating colored areas differing in hue, and the numerical indicia indicating the different degrees of slant of the off-axis meridians, whereby to facilitate determination of the presence and amount of astigmatism, if astigmatism exists.

What I claim is:

1. An eye-testing chart for testing for astigmatism having displayed thereon groups of parallel lines radiating from a common center and constituting meridians, one of said meridians being vertical and another being horizontal, the other meridians, disposed between those already mentioned, constituting off-axis meridians; colored or shaded indicating-areas on said chart which differ in color or shade from each other, disposed respectively at the outer ends of said off-axis meridians; and indicia associated respectively with said off-axis meridians, which indicia inform the examiner at what angle from the vertical or from the horizontal to place a correcting cylindrical lens before the eye under examination.

2. A chart for testing for astigmatism, having displayed thereon groups of parallel lines radiating from a common center and constituting meridians, one of said meridians being vertical and another being horizontal, the other meridians, disposed between those already mentioned, constituting off-axis meridians; colored or shaded indicating-areas which differ in color or shade from each other, associated respectively with said off-axis meridians; and indicia associated respectively with said off-axis meridians, which indicia inform the examiner at what angle from the vertical or from the horizontal to place a correcting cylindrical lens before the eye under examination.

OLIVER P. BIGELOW.

CERTIFICATE OF CORRECTION.

Patent No. 2,184,920. December 26, 1939.

OLIVER P. BIGELOW.

It is hereby certified that error appears in the printed specification of the above numbered patent requiring correction as follows: Page 1, first column, line 15, for the word "with" read without; and that the said Letters Patent should be read with this correction therein that the same may conform to the record of the case in the Patent Office.

Signed and sealed this 5th day of March, A. D. 1940.

(Seal)

Henry Van Arsdale,
Acting Commissioner of Patents.